US010562365B2

(12) United States Patent
Schmidt

(10) Patent No.: US 10,562,365 B2
(45) Date of Patent: Feb. 18, 2020

(54) VIBRATION DAMPER OF A VEHICLE WHEEL

(71) Applicant: Bayerische Motoren Werke Aktiengesellschaft, Munich (DE)

(72) Inventor: Roland Schmidt, Stockdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 365 days.

(21) Appl. No.: 15/337,789

(22) Filed: Oct. 28, 2016

(65) Prior Publication Data

US 2017/0043639 A1 Feb. 16, 2017

Related U.S. Application Data

(63) Continuation of application No. PCT/EP2015/059223, filed on Apr. 28, 2015.

(30) Foreign Application Priority Data

Apr. 29, 2014 (DE) .......................... 10 2014 208 083

(51) Int. Cl.
*B60G 17/08* (2006.01)
*B60G 13/00* (2006.01)
(Continued)

(52) U.S. Cl.
CPC ........... *B60G 17/08* (2013.01); *B60G 13/001* (2013.01); *B60G 13/003* (2013.01);
(Continued)

(58) Field of Classification Search
CPC .... B60G 17/08; B60G 15/062; B60G 13/001; B60G 15/068; B60G 15/067;
(Continued)

(56) References Cited

U.S. PATENT DOCUMENTS 3,409,286 A * 11/1968 Erdmann ............. B60G 15/062
267/64.17
3,770,258 A 11/1973 Takahashi et al.
(Continued)

FOREIGN PATENT DOCUMENTS

DE 34 09 154 A1 9/1984
DE 196 29 959 A1 1/1998
(Continued)

OTHER PUBLICATIONS

Chinese Office Action issued in Chinese counterpart application No. 201580007862.X dated May 4, 2017, with English translation (Thirteen (13) pages).
(Continued)

*Primary Examiner* — Paul N Dickson
*Assistant Examiner* — Timothy Wilhelm
(74) *Attorney, Agent, or Firm* — Crowell & Moring LLP

(57) ABSTRACT

A vibration damper of a vehicle wheel is supported on a vehicle body by a damper mount having an elastic body. The vibration damper includes a fluid-filled cylinder, a piston guided in the cylinder, and a piston rod. A wherein a damper chamber is formed in the cylinder on each side of the piston. The damper mount includes a hydraulic pressure chamber connected via a fluid-conducting connection to the damper chambers, whose volumes are respectively reduced when the vehicle wheel is deflected in relation to the vehicle body. In addition, a throttle valve is provided in the fluid-conducting connection, wherein the throttle value comprises a valve body that is displaceable in relation to a valve seat counter to a spring force, and a throttle bore.

17 Claims, 5 Drawing Sheets

(51) Int. Cl.
*B60G 15/06* (2006.01)
*F16F 9/54* (2006.01)
*F16F 13/10* (2006.01)
*F16F 9/06* (2006.01)
*F16F 9/34* (2006.01)
*F16F 9/516* (2006.01)
*F16F 13/00* (2006.01)

(52) U.S. Cl.
CPC ......... *B60G 15/062* (2013.01); *B60G 15/067* (2013.01); *F16F 9/065* (2013.01); *F16F 9/34* (2013.01); *F16F 9/516* (2013.01); *F16F 9/54* (2013.01); *F16F 13/007* (2013.01); *F16F 13/10* (2013.01); *B60G 2202/416* (2013.01); *B60G 2204/128* (2013.01); *B60G 2204/41062* (2013.01); *B60G 2206/4222* (2013.01)

(58) Field of Classification Search
CPC .... B60G 15/066; B60G 13/003; B60G 17/04; B60G 2204/41062; B60G 2206/4222; B60G 2204/128; B60G 2202/416; F16F 13/08; F16F 9/516; F16F 13/007; F16F 9/34; F16F 9/54; F16F 13/10; F16F 9/065
See application file for complete search history.

(56) References Cited

U.S. PATENT DOCUMENTS

| | | | | |
|---|---|---|---|---|
| 4,234,172 A | * | 11/1980 | Takahashi | B60G 15/00 188/298 |
| 4,345,661 A | | 8/1982 | Nishikawa | |
| 4,364,582 A | * | 12/1982 | Takahashi | B60G 15/067 188/298 |
| 4,673,171 A | * | 6/1987 | Buma | B60G 11/30 188/266.3 |
| 4,773,635 A | * | 9/1988 | Buma | F16F 9/466 188/266.4 |
| 6,322,058 B1 | * | 11/2001 | Tanigawa | B60G 15/12 188/269 |
| 8,042,791 B2 | * | 10/2011 | Schmitz | F16F 9/5126 267/64.17 |
| 8,317,172 B2 | * | 11/2012 | Quinn | B60G 17/06 267/219 |
| 8,376,100 B2 | * | 2/2013 | Avadhany | B60G 13/14 180/165 |
| 9,174,508 B2 | * | 11/2015 | Anderson | B60G 17/016 |
| 9,488,243 B2 | * | 11/2016 | Hanawa | F16F 9/46 |
| 2009/0000469 A1 | * | 1/2009 | Schmitz | B60G 13/001 92/99 |

FOREIGN PATENT DOCUMENTS

| | | | | |
|---|---|---|---|---|
| DE | 199 51 693 C1 | 4/2001 | | |
| DE | 10 2008 008 007 A1 | 8/2009 | | |
| DE | 10 2010 007 237 A1 | 9/2010 | | |
| DE | 102010007237 A1 | * 9/2010 | ......... | B60G 17/0152 |
| FR | 2.136.785 A5 | 12/1972 | | |
| FR | 2 471 873 A1 | 6/1981 | | |
| JP | 52-98874 A | 8/1977 | | |
| JP | 58-119409 U | 8/1983 | | |
| JP | 58-136506 A | 8/1983 | | |
| JP | 5-215178 A | 8/1993 | | |

OTHER PUBLICATIONS

PCT/EP2015/059223, International Search Report dated Dec. 10, 2015 (Three (3) pages).
PCT/EP2015/059227, International Search Report dated Aug. 3, 2015 (Three (3) pages).

\* cited by examiner

VIBRATION DAMPER OF A VEHICLE WHEEL

CROSS REFERENCE TO RELATED APPLICATIONS

This application is a continuation of PCT International Application No. PCT/EP2015/059223, filed Apr. 28, 2015, which claims priority under 35 U.S.C. § 119 from German Patent Application No. 10 2014 208 083.5, filed Apr. 29, 2014, the entire disclosures of which are herein expressly incorporated by reference.

BACKGROUND AND SUMMARY OF THE INVENTION

The invention relates to a hydraulic vibration damper of a vehicle wheel, which vibration damper is supported on the vehicle body by means of a damper mount having a rubber-elastic body, and which vibration damper has a fluid-filled cylinder and a piston which is guided in the latter and has a piston rod, and wherein in the damper mount a hydraulic pressure chamber is formed which is connected via a fluid-conducting connection having a throttle valve to a first damper chamber which is formed in the damper cylinder on the side of the damper piston facing away from the damper mount, as found in the closest prior art in DE 196 29 959 A1.

The vibration dampers which are provided on a vehicle between its wheels and the vehicle body, which is supported in the vertical direction on these wheels by means of what are referred to as supporting springs, serve the deflection and rebound of the respective wheel (i.e. when the latter moves essentially in the vertical direction in relation to the body) in order to damp this deflection movement (directed toward the body) or rebound movement (directed away from the body). Such hydraulic vibration dampers usually comprise a (damper) cylinder in which a (damper) piston is displaceably guided in the direction of the deflection and rebound movement. The piston in the cylinder moves as a result of (vertical) movements of the respective wheel in relation to the vehicle body and in doing so expels hydraulic fluid, in particular an oil. The piston rod of the vibration damper is usually connected to the vehicle body via a rubber-elastic damper mount, while the cylinder of the vibration damper is rigidly attached to a wheel carrier which supports the wheel in a rotatable fashion. In such a damper mount, the free end of the piston rod is supported with a rubber-elastic body which is embodied in the manner of a hollow cylinder and in whose center the piston rod is located, usually permanently connected by means of an attachment plate, while the outside of this rubber-elastic body is supported on the vehicle body.

DE 196 29 959 A1, referenced above, presents a vibration damper arrangement having a hydraulic mount, wherein the specified rubber-elastic body is supported against a hydraulic pressure chamber which is hydraulically connected to that chamber in the cylinder of the damper whose volume is reduced when the wheel is deflected in relation to the vehicle body. Therefore, it is possible to damp not only the low-frequency vibrations of the vehicle wheels within the scope of their visible deflection and rebound movements, but also relatively high frequency vibrations which are introduced in the direction of the vehicle body from the underlying surface via the wheels. These vibrations are also capable of being damped with such a vibration damper on the basis of the hydraulic mount in that hydraulic fluid is conveyed from the damper cylinder into the pressure chamber of the hydraulic mount when the wheel is deflected. However, it appears particularly advantageous that, when the wheel is deflected, the volume of hydraulic fluid which is expelled by the piston rod in the vibration damper can be absorbed by the chamber in the damper mount. As a result, a gas pressure accumulator which is customary in single-tube vibration dampers, on the base of the vibration damper, can be dispensed with.

The present invention is then intended to disclose, for a vibration damper of a vehicle wheel, how the damping of relatively high frequency vibrations can be improved, for example in the field of the neutral frequency of the vehicle body in the area surrounding the damper mount.

A throttle valve which has a valve body which can be displaced in relation to a valve seat counter to spring force and has a throttle bore is provided in the fluid-conducting connection. Advantageous refinements of the invention form the subject matter of the dependent claims.

According to the invention, at least one throttle valve, whose throttle effect can be varied as a function of peripheral conditions, is arranged in the fluid-conducting connection between the hydraulic pressure chamber of the damper mount and the chamber in the damper cylinder which is reduced in the case of deflection of the wheel. Such a throttle valve can run through the piston rod in the form of a duct, but does not expressly have to run through the latter. For this purpose, this throttle valve has a valve body which can be displaced as a function of peripheral conditions and through which a throttle bore runs, through which throttle bore at any rate a certain small quantity of hydraulic fluid can also then theoretically flow between the pressure chamber of the damper mount and the specified chamber of the damper cylinder even if the valve body is seated on a valve seat or its valve seat. In contrast, as long as this valve body which can be displaced within a valve housing and is held in a specific position by at least one spring element without the effect of a hydraulic force moved away, (i.e. lifted off) from a valve seat or its valve seat, a relatively large quantity of hydraulic medium can always pass through this throttle valve, i.e. in the fluid-conducting connection. Therefore, the damping acting on relatively high frequency vibrations between the respective wheel and the vehicle body in the damper mount can in fact be influenced as a function of whether the valve body is seated on its valve seat or lifted off therefrom.

As far as the term "relatively high frequency" or the damping of "relatively high frequency vibrations" is concerned, the rubber-elastic body of the damper mount by means of which, for example, the piston rod of the vibration damper is supported or mounted on the vehicle body is configured in such a way that relatively high frequency or high frequency excitations, preferably above 10 Hz to 15 Hz (the range of these high frequency excitations can extend up to several thousand Hertz) can be damped. In contrast, as is customary, the vibration damping between the respective vehicle wheel and the vehicle body in the low-frequency range (below this numerically specified frequency range) is taken up by the actual vibration damper, namely by the unit composed of the damper cylinder and the damper piston. In the case of a vibration damper according to the invention, two damper systems are therefore connected in series. On the one hand, in the low-frequency range (less than 10 Hz-15 Hz) the customary damping is provided by means of the piston which is guided in the damper cylinder, while for the relatively high frequency range the damping is carried out by means of the elastic body in the damper mount. At the same time, preferably no relative movement occurs between the damper piston and the damper cylinder. And, in this relatively high frequency range, the elastic body can then be relieved by the pressure which is present in the hydraulic pressure chamber of the damper mount or which is transmitted into it via the fluid-conducting connection. Without such relief, the rubber-elastic body would in fact deform greatly, and as a consequence of this it would harden owing to its material properties, which would worsen the desired high-frequency vibration decoupling from the body work. In this context, the degree of this stabilization or relief of the elastic body, and therefore also of the relatively high frequency damping itself, are dependent on the position of the displaceable valve body of the throttle valve according to the invention (in the fluid-conducting connection).

The damping property in the damper mount configured according to the invention can in fact be configured in a frequency-selective fashion by virtue of a throttle valve, according to the invention, and by suitable configuration of the cross section of the throttle bore which is provided in the valve body thereof (also in relation to the cross section of the fluid-conducting connection itself). If the fluid-conducting connection is narrow or throttled, at low frequencies a complete pressure equalization takes place between the damper chamber (connected to the pressure chamber of the damper mount via the fluid-conducting connection) in the damper cylinder and the pressure chamber in the damper mount. In contrast, at high frequencies, the hydraulic column in the fluid-conducting connection can no longer follow owing to its inertia and consequently a pressure difference occurs between the pressure chamber of the damper mount of the damper chamber. This can be used for selective configuration of the damping properties in the damper mount with respect to specific, in particular relatively high frequencies (according to the explanation above). Since, in fact, in the relatively high frequency range no complete pressure equalization takes place, deformation of the rubber-elastic element can be forcibly brought about in a targeted fashion in order to use the damping properties thereof.

A so-called active vibration damper whose damper chambers which are provided in the damper cylinder are connected to one another via a hydraulic pump which is driven (preferably by an electric motor), is configured or mounted on the vehicle body in a fashion described above, wherein in a way analogous to the customary prior art an independent hydraulic pressure accumulator is provided, in particular, for that hydraulic fluid quantity which is, as it were, expelled in the compression stage of the vibration damper by the piston rod within the damper cylinder and/or from the damper chamber thereof which increases in size during the spring compression of the wheel. A roll stabilizer (of the vehicle body in the case of rapid cornering of the vehicle) can be formed with such active vibration dampers, for example on a two-track, two-axle vehicle. Whereas, in fact, the rolling torque which occurs in the case of steady-state circular travel on such a vehicle with simple, non-active vibration dampers is supported only via the supporting springs and a customarily provided lateral stabilizer and at the same time virtually no forces occur in the damper mount, rolling of the vehicle body can be prevented or limited by means of an active vibration damper by applying a force to the damper mount and therefore to the vehicle body via the piston rod of the vibration damper. However, without the inventive hydraulic pressure chamber in the damper mount, this force would bring about tensioning and therefore hardening of the elastic body which is provided in the damper mount, which would prevent technical vibration decoupling between the actual vibration damper (or the wheel) and the vehicle body which is to be performed actually by this elastic body.

Within the scope of the present invention, it has therefore been determined that, in particular in the case of active vibration dampers, tensioning can occur in the elastic body of a customary (simple) damper mount without a hydraulic pressure chamber as a consequence of relatively high actuation forces (for example for roll stabilization), as a result of which this elastic body, via which, as explained at the beginning, the piston rod of the vibration damper is preferably mounted on the vehicle body, hardens. Since this is undesired with respect to the transmission of relatively high frequency vibrations into the vehicle body, such hardening should be avoided owing to overloading of the elastic body, which can be achieved by said hydraulic pressure chamber via which the actual vibration damper (and in the preferred arrangement with a damper cylinder located at the bottom of the piston rod of the cylinder) is supported additionally on the vehicle body—and at the same time relieving the elastic body of loading. Since in this context the degree of effectiveness of this hydraulic pressure chamber of a damper mount according to the invention can be changed in a frequency-dependent fashion by means of the throttle valve proposed according to the invention, a vibration damper according to the invention can easily and ideally be adapted to the respective installation situation, i.e. to the existing vehicle body and to the existing wheel suspension system (and the sensitivity with respect to relatively high frequency vibrations which is predefined by these elements).

Moreover, by virtue of the fact that the damper chamber which is reduced in size when the wheel is deflected (in relation to the vehicle body) is connected to the hydraulic pressure chamber provided in the damper mount, it is ensured that when the wheel is deflected, and therefore when the damper chamber is compressed, hydraulic fluid is conveyed into the pressure chamber. As a result, the elastic body is stabilized or relieved of loading in particular when deflection occurs.

The throttle valve which is provided according to the invention in the fluid-conducting connection between a damper chamber and the hydraulic pressure chamber of the damper mount can be embodied as what is referred to as a rebound stage throttle valve and therefore can be effective in a throttling fashion in particular in what is referred to as the rebound stage of the vibration damper (during which the wheel rebounds, i.e. moves away, as it were, from the vehicle body). The valve body of such a rebound stage throttle valve then lifts off, in what is referred to as the compression stage of the vibration damper, when the wheel experiences deflection, counter to the force of a spring element which presses the valve body against the valve seat thereof without the effect of other forces, then lifts off from the valve seat and then virtually no longer acts in a throttling fashion.

Alternatively, the throttle valve provided according to the invention can be embodied as what is referred to as a rebound stage and compression stage throttle valve, and can therefore be effective in the throttling fashion both in the rebound stage of the vibration damper and in the compression stage. As a particular feature it is possible, by using two valve bodies with differently dimensioned throttle bores, to bring about, for the rebound stage and the compression stage of the vibration damper a different throttling effect and therefore bring about an at least slightly different damping behavior with respect to relatively high vibration frequencies. The two valve bodies can be mounted or guided in a valve housing which is sufficiently large in order then to absorb that quantity of hydraulic medium for a short time, which quantity then passes through the valve body which is lifted off from its valve seat, while the respective other valve body is seated in a spring-loaded fashion on its valve seat. This will also be described in detail later on the basis of a schematically illustrated exemplary embodiment.

Alternatively, the throttle valve provided according to the invention can be embodied as what is referred to as an amplitude-selective throttle valve. The valve body, which can be displaced preferably in the rebound stage direction and in the compression stage direction within a valve housing is held in the state in which it is lifted off from two valve seats lying opposite one another, without a hydraulic force acting between them. With such an embodiment, the throttle effect of the throttle valve, according to the invention, can be made dependent on the size of the amplitudes of the displacement of the damper piston in the damper cylinder of the vibration damper. In the case of relatively small vibration amplitudes of the vehicle wheel, assigned to the (respective) vibration damper, in relation to the vehicle body, this valve body remains spaced apart from its two valve seats, and therefore hardly acts in the throttling fashion, whereas in the case of relatively large wheel strokes, i.e. displacement travel of the respective vehicle wheel in relation to the vehicle body, the valve body is pressed against one of the valve seats and then acts in a highly throttling fashion.

The hydraulic pressure chamber of the damper mount according to the invention has a hydraulically effective first area, considered in a plane lying perpendicularly with respect to the piston rod of the vibration damper. The damper piston of the vibration damper according to the invention has, with respect to that damper chamber which is hydraulically connected to the pressure chamber of the damper mount via the fluid-conducting connection, a hydraulically effective second area, considered in a plane lying perpendicularly with respect to the piston rod of the vibration damper. The size of the first area is preferably approximately 80% to 120% of the size of the second area. As a result of this approximate equality of the two areas, an equilibrium of forces is established, with the result that the elastic body is approximately free of tension, as a result of which the risk (already mentioned repeatedly) of hardening of the body is greatly reduced. In particular in the case of an embodiment of the vibration damper already mentioned as an active vibration damper, this is advantageous because in this way the elastic body is able to deform elastically even in the case of large damper actuating forces. A certain deviation, for example of the order of magnitude of 20% from an "absolute" equality of area can be advantageous for what is referred to as the response of the vibration damper. More difficult "breaking out" of the piston rod at the piston rod seal as a result of the high internal pressure is known, in particular in the case of single-tube dampers. As a result of a certain inequality of the first and second areas, in the case of a pressure fluctuation in the damper cylinder, the piston rod is actively set in motion by the piston mount. The "breaking out" of the piston rod therefore already takes place before a possible deflection or rebound movement of the respective wheel. During the deflection and rebound it is therefore no longer necessary first to overcome the static friction of the piston rod seal, but instead the deflection movement or rebound movement takes place, as it were, already in the sliding friction.

In addition to the elastic body, a hydraulic damping device can also be integrated in the damper mount. Such a hydraulic damping device comprises a fluid-filled first working space in the elastic body and a second working space within the damper mount outside the elastic body, and at least one throttle between these two working spaces. The two working spaces are advantageously arranged as annular spaces concentrically around the piston rod. Accordingly, an annular disk with suitable holes (which can, if appropriate, be additionally provided with valve plates) is advantageously proposed as throttle. In this context, a gas-filled equalization space can also be provided. A diaphragm is located between the equalization space and the second working space. If the piston rod then moves owing to a deflection movement or rebound movement of the wheel, the elastic body is also set in motion. As a result, hydraulic fluid is moved through the throttle between the two working spaces, as a result of which additional damping (additional to the effect of the rubber-elastic body) occurs.

As has already been stated, a vibration damper according to the invention can advantageously be embodied as an active vibration damper. For this purpose, the damper comprises a hydraulic pump which is connected between the two damper chambers and can be driven by an electric machine. It is therefore also possible for hydraulic fluid to be conveyed selectively from one chamber of the vibration damper into the other damper chamber of the damper cylinder, and as a consequence of which the vehicle body can be selectively raised or lowered in relation to the respective wheel.

As a result, for example equalization of reciprocating movements and rolling movements of the vehicle is possible. In this context, the electric machine which is coupled in terms of drive to the hydraulic pump can also be used as a generator, with the result that in the case of a rebound movement or deflection movement of the wheel which is caused by the travel of the vehicle on an underlying surface it is possible to acquire electrical energy, wherein at the same time the desired damping of the deflection movement or rebound movement of the vehicle wheel in relation to the vehicle body takes place. In this context, it is, however, necessary to take into account the fact that owing to the inertia of the hydraulic pump and the electric machine, the effective regulation of the damping is limited to relatively low frequencies. The effective damping of this vibration movement can therefore be achieved virtually only in the frequency range of the visible vertical vibrations of the wheel in relation to the vehicle body, i.e. in the region of the low-frequency body frequencies. However, in the region of the natural frequency of the vibrations of the vehicle body, and therefore in the region of the relatively high frequency vibrations as mentioned above and referred to as wheel frequencies, it is therefore not possible to achieve any effective damping and the damping which can be achieved by a simple rubber-elastic body in the damper mount is also insufficient. The result is that a simple active vibration damper with a simple customary damper mount exhibits clear, in particular acoustic, weaknesses which imparts an uncomfortable driving feeling to the driver of the vehicle which is equipped therewith. These weaknesses can be avoided with an inventive vibration damper with a hydraulic pressure chamber in the damper mount and suitably adjusted throttle valve.

Other objects, advantages and novel features of the present invention will become apparent from the following detailed description of one or more preferred embodiments when considered in conjunction with the accompanying drawings.

DETAILED DESCRIPTION OF THE DRAWINGS

In the text which follows, an exemplary embodiment of a vibration damper 1 according to the invention for a vehicle is described in detail with reference to FIGS. 1 to 5.

Figure 1:
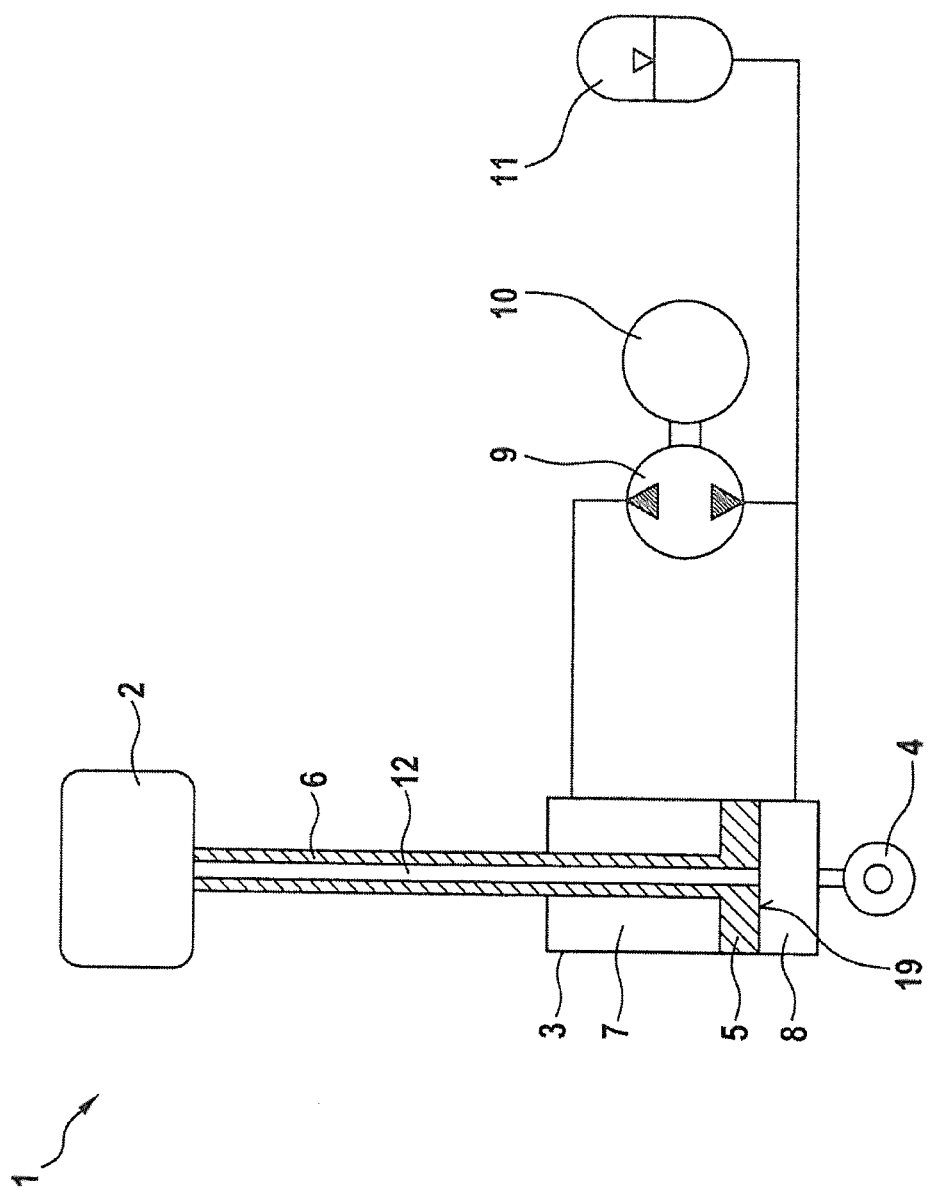
FIG. 1 shows a schematic view of an active vibration damper having a damper mount according to the invention.

FIG. 1 shows a schematic highly simplified view of the vibration damper 1 with a damper mount 2. The damper mount 2 is attached to a bodywork (not illustrated figuratively) of a vehicle, i.e. to the vehicle body. The damper mount 2 is also connected to a piston rod 6 of the vibration damper 1. The piston rod 6 is permanently connected to a damper piston 5. The damper piston 5 is guided in a linearly movable fashion in a damper cylinder 3 which is filled with hydraulic fluid. The damper cylinder 3 is generally also referred to as a damper tube of the vibration damper 1. The damper cylinder 3 is usually, and also here, arranged on the wheel side with the connection 4 and is for this purpose connected, by way of example, to a wheel carrier or to a wheel-guiding control arm of the respective vehicle wheel. The damper piston 5 divides the damper cylinder 3 into a first damper chamber 7, here above the piston 5, and a second damper chamber 8, here below the piston 5. During the deflection and rebound of the wheel, the piston 5 moves in relation to the damper cylinder 3 wherein the second damper chamber 8 is reduced in size in what is referred to as the compression stage of the vibration damper 1 when the wheel is deflected toward the vehicle body, while in what is referred to as the rebound stage of the vibration damper 1 when the vehicle wheel rebounds away from the vehicle body, the first damper chamber 7 is reduced in size.

FIG. 1 also shows a hydraulic pump 9 which can be driven by an electric machine 10 and which is connected or operatively connected hydraulically to the two damper chambers 7, 8. It is therefore a case here of an active damper system or an active vibration damper, since the damper piston 5 can be adjusted or displaced in relation to the damper cylinder 3 by means of the hydraulic pump 9. As a result of such an active hydraulic adjustment of the damper piston 5, it is possible, for example, to counteract rolling movements of the vehicle body. In this case, the damper piston 5 and the damper cylinder 3 and therefore the vibration damper 1 act as a force-regulating hydraulic cylinder. Furthermore, FIG. 1 shows a hydraulic pressure accumulator 11 which is connected to the hydraulic circuit of the two damper cylinders 7, 8 and of the hydraulic pump 9. In this pressure accumulator 11, it is possible, in particular, to store that quantity of hydraulic fluid which is, as it were, expelled in the compression stage of the vibration damper 1 through the piston rod 6 within the damper cylinder 3 (or in the damper chamber 7 thereof). When the vibration damper is embodied as a two-tube damper, this pressure accumulator 11 or the function thereof can also be integrated into the wall of the damper tube 3 which is then "doubled" as is customary.

The unit composed of the hydraulic pump 9 and electric machine 10 can also be used as a generator for generating electric energy if, as is customary, the damper piston 5 is displaced (vertically) onto the vehicle body in relation to the damper cylinder 3 in the driving mode of the vehicle during the deflection or rebounding of the wheel as a result of vehicle movement dynamic influences or as a result of influences of the underlying surface. In this context, the damping of this deflection movement or rebound movement which oscillates to a limited extent takes place in practice only by means of the generator mode of the electric machine 10 which is then driven by the hydraulic pump 9, for which reason, in contrast to the case of customary passive vibration dampers, no throttled passage openings for hydraulic fluid are provided in the damper piston 5.

As FIG. 1 shows, a fluid-conducting connection 12 is formed in the piston rod 6. This fluid-conducting connection 12 opens into the damper chamber 8 located underneath the damper piston 5. A more detailed embodiment of the damper mount 2 and the upper mouth, provided therein, of the fluid-conducting connection 12 is shown in FIG. 2, in which, however, an inventive throttle valve 25, 26, 27 is also illustrated in an abstract fashion, specifically only by means of its valve housing 32.

Figure 2:
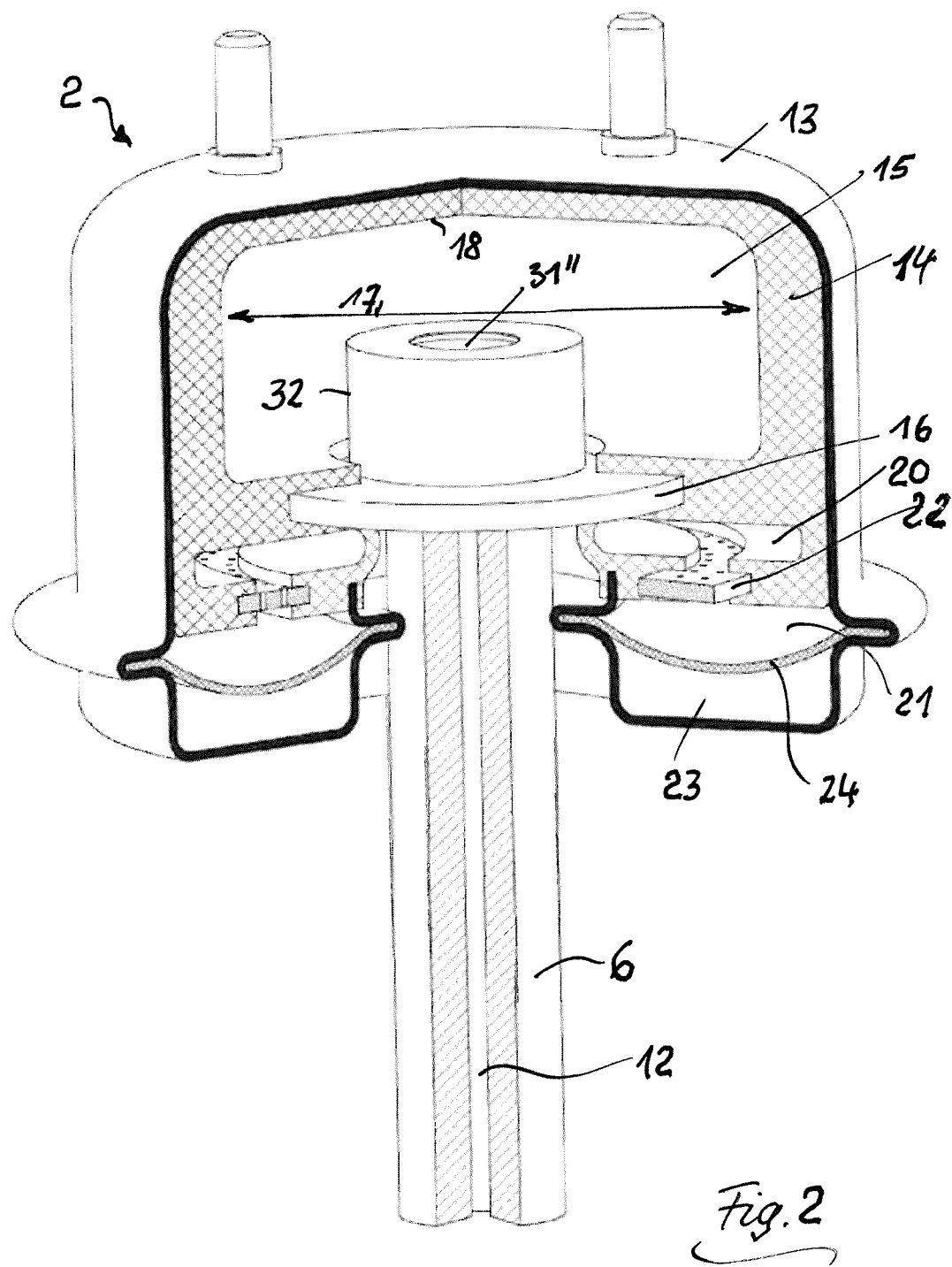
FIG. 2 shows a sectional view through a possible embodiment of the damper mount of a vibration damper according to the invention, wherein of the throttle valve explained above only the valve housing surrounding it can be seen.

According to FIG. 2, the damper mount 2 has a housing 13 on whose upper side are provided screw bolts, not characterized in more detail, via which this housing 13 and therefore the vibration damper 1 is attached to the body of the vehicle. In this housing 13 there is an elastic body 14, which is embodied in an abstract fashion in the manner of a hollow cylinder, and is made of rubber, specified here as being a rubber-elastic body 14. Within this rubber-elastic body 14 a cavity is formed which functions as a hydraulic pressure chamber and therefore is also referred to as a hydraulic pressure chamber 15. The fluid-conducting connection 12 which runs in the piston rod 6 opens into this hydraulic pressure chamber 15. With the exception of the fluid-conducting connection 12, the pressure chamber 15 is formed in a fluid-tight fashion within the elastic body 14.

In order to attach the piston rod 6 in a centrally located fashion in the rubber-elastic body 14 there is an attachment plate 16 located on the piston rod 6, the attachment plate 16 being in turn embedded in the rubber-elastic body 14. The force which is transmitted by the piston rod 6 and movements of the piston rod 6, which oscillate at a slightly higher frequency (in particular in the vertical direction, i.e. in the longitudinal direction of the piston rod 6), are transmitted into the rubber-elastic body 14 via this attachment plate 16. In turn, the force which is applied by the piston rod 6, and initially actually also the movements of the piston rod 6 which oscillate at a relatively high frequency are transmitted from the rubber-elastic body 14 into the body of the vehicle via the housing 13 on which the rubber-elastic body 14 is supported. The latter, specifically undamped transmission of movements of the piston rod 6 which oscillate at relatively high frequency into the vehicle body is, however, undesired, for which reason these movements should be attenuated or damped as intensively as possible. This damping is usually carried out by the rubber-elastic body 14 itself, but its capability to damp such relatively high frequency oscillations is highly limited if a large force is applied to this rubber-elastic body 14.

In order to avoid the latter, the fluid-conducting connection 12 is provided here between the lower damper chamber 8 of the vibration damper 1 and the hydraulic pressure chamber 15 of the damper mount 2. FIG. 2 explains a similar detail and shows a diameter 17 of the (here) circular cylindrical hydraulic pressure chamber 15 which is measured in a plane on which the piston rod 6 stands perpendicularly. In a plane which is parallel to this plane (corresponding to this diameter 17 of the pressure chamber 15) a first hydraulically active area 18 of the pressure chamber 15 is defined. FIG. 1 then shows a second hydraulically active area 19 of the (also circular cylindrical) piston 5 in the second damper chamber 8. The size of the first (hydraulically active) area 18 is 80% to 120% of the size of the second (hydraulically active) area 19. As a result, approximately an equilibrium of forces is established between these two (hydraulically active) areas 18, 19 via the fluid-conducting connection 12, with the result that the rubber-elastic body 14 is not loaded in the region of the attachment disk 16 by the forces transmitted to the vehicle body by the piston rod 16, and is therefore approximately tension-free, with the result that this rubber-elastic body 14 can perform its damping function as well as possible with respect to movements of the piston rod 16 which oscillate at a relatively high frequency (in particular in the vertical direction).

FIG. 2 furthermore shows a valve housing 32 which is advantageously arranged on the attachment disk 16, with an upper overflow opening 31" for hydraulic medium which can pass from the fluid-conducting connection 12 in the piston rod 6 into the interior of the valve housing 32, as will also be explained at a later point. A throttle valve, which is explained in more detail on the basis of the following FIGS. 3-5 and which is therefore in practice provided in the fluid-conducting connection 15, is arranged inside this valve housing 32. Using such a throttle valve it is possible to adjust the damping behavior of the rubber-elastic body 14 or the entire characteristic of the vibration damper 1 in the best possible way to the respective vehicle in which the vibration damper according to the invention is installed.

FIG. 2 also shows an additional hydraulic damping device which can be integrated into the damper mount 2, and in this exemplary embodiment (in contrast to the embodiments according to FIGS. 3-5) is integrated into the damper mount 2. This hydraulic damping device comprises a first working space 20 which is formed in the rubber-elastic body 14 itself, specifically on the side of the attachment disk facing away from the hydraulic pressure chamber 15. Furthermore, a throttle plate 22, which is annular here and in which a multiplicity of passage openings for hydraulic fluid is provided is inserted into the rubber-elastic body 14. This throttle plate 22 divides the first working space 20 from a second working space 21. The second working space 21 is located outside or underneath the rubber-elastic body 14, still inside the housing 13. Furthermore, a gas-filled equalization space 23 is provided in the housing 13. The gas-filled equalization space 23 is separated from the second working space 21 by means of a diaphragm 24. As is shown by FIG. 2, the first working space 20, the second working space 21, the throttle plate 22, the equalization space 23 and the diaphragm 24 are arranged as annular elements concentrically around the piston rod 6. If a certain (oscillating) movement in the longitudinal direction of the piston rod 6 is applied into the elastic body 14 via the piston rod 6, hydraulic fluid passes over between the two working spaces 20 and 21 through the passage openings in the throttle plate 22, as a result of which additional damping of such high frequency movements or oscillation excitations takes place.

Figure 3:
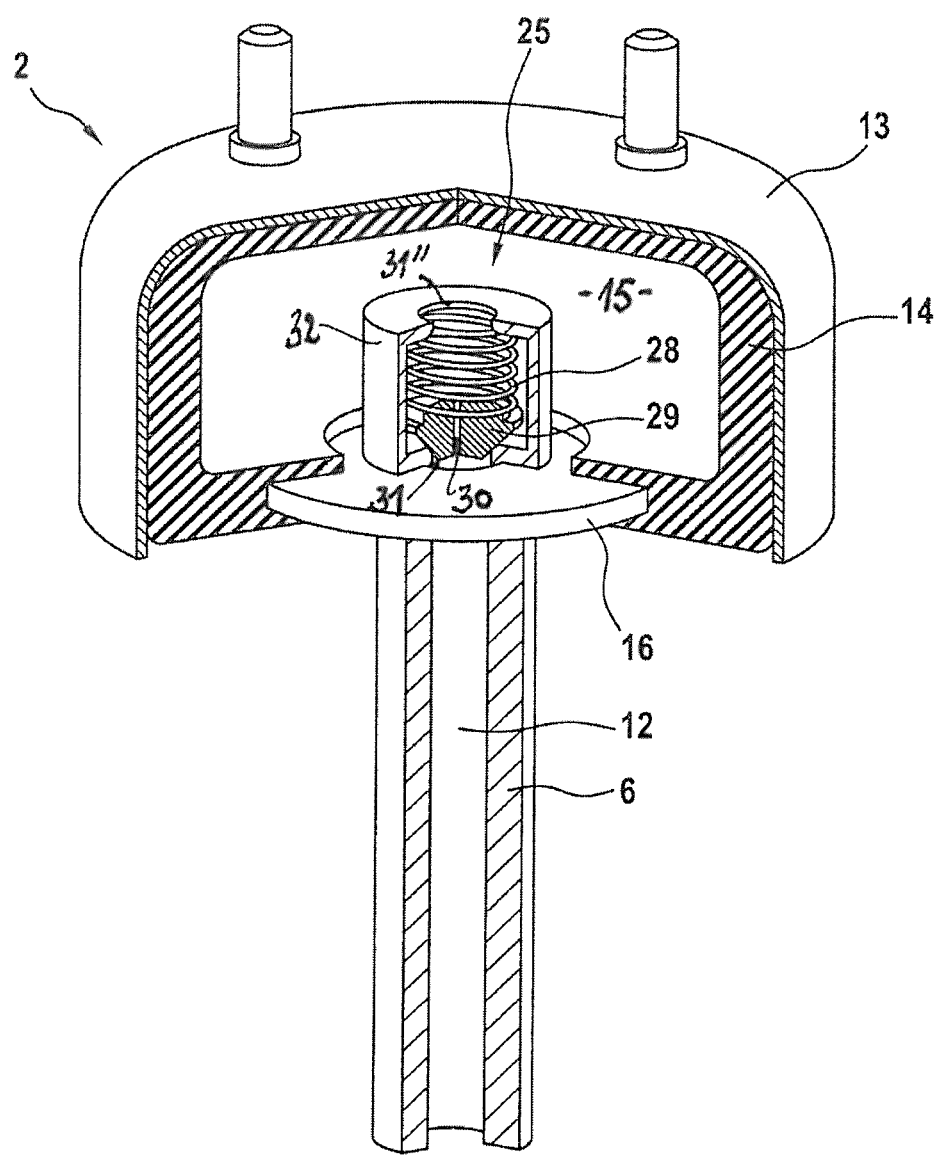
FIGS. 3 to 5 show three possible embodiments of a throttle valve according to the invention in the damper mount of a vibration damper according to the invention in an illustration which is analogous to FIG. 2.
Figure 4:
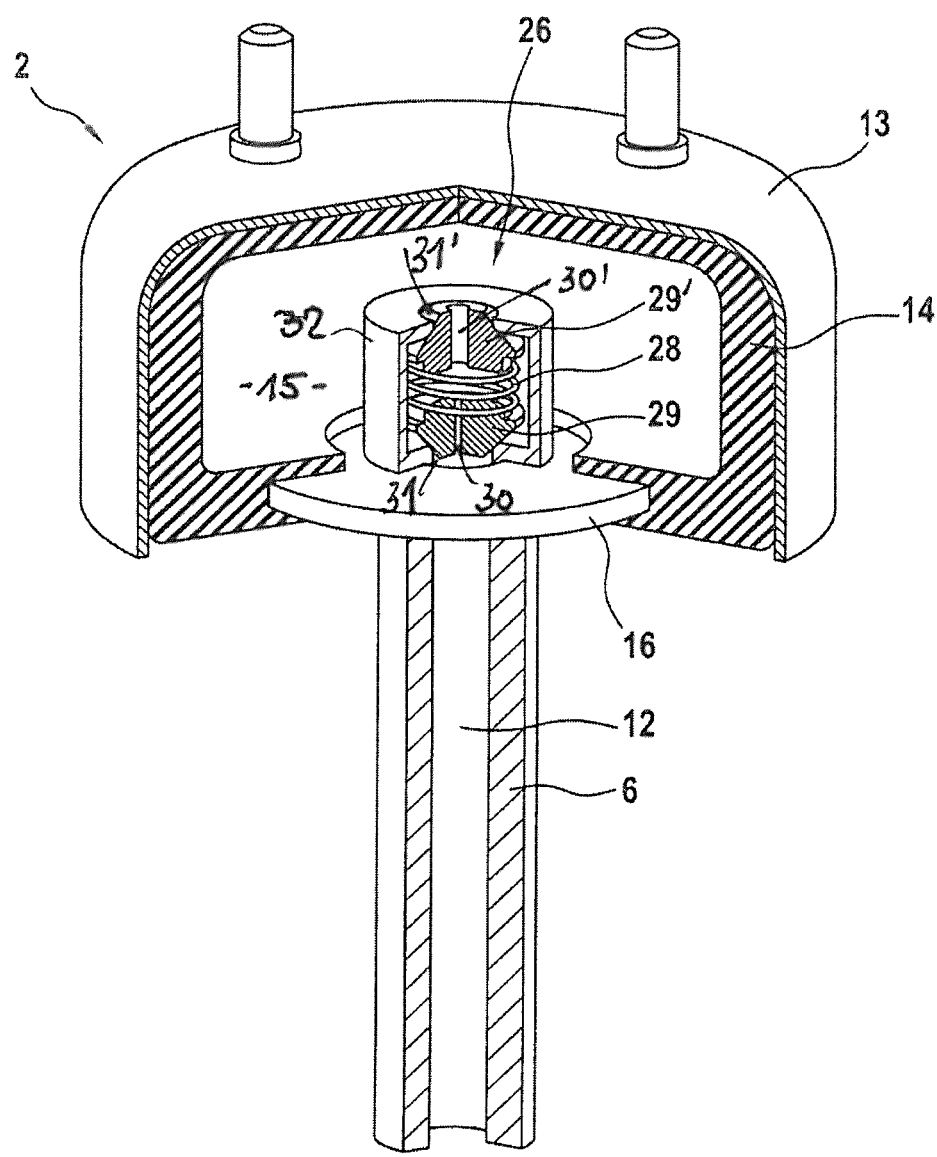
Figure 5:
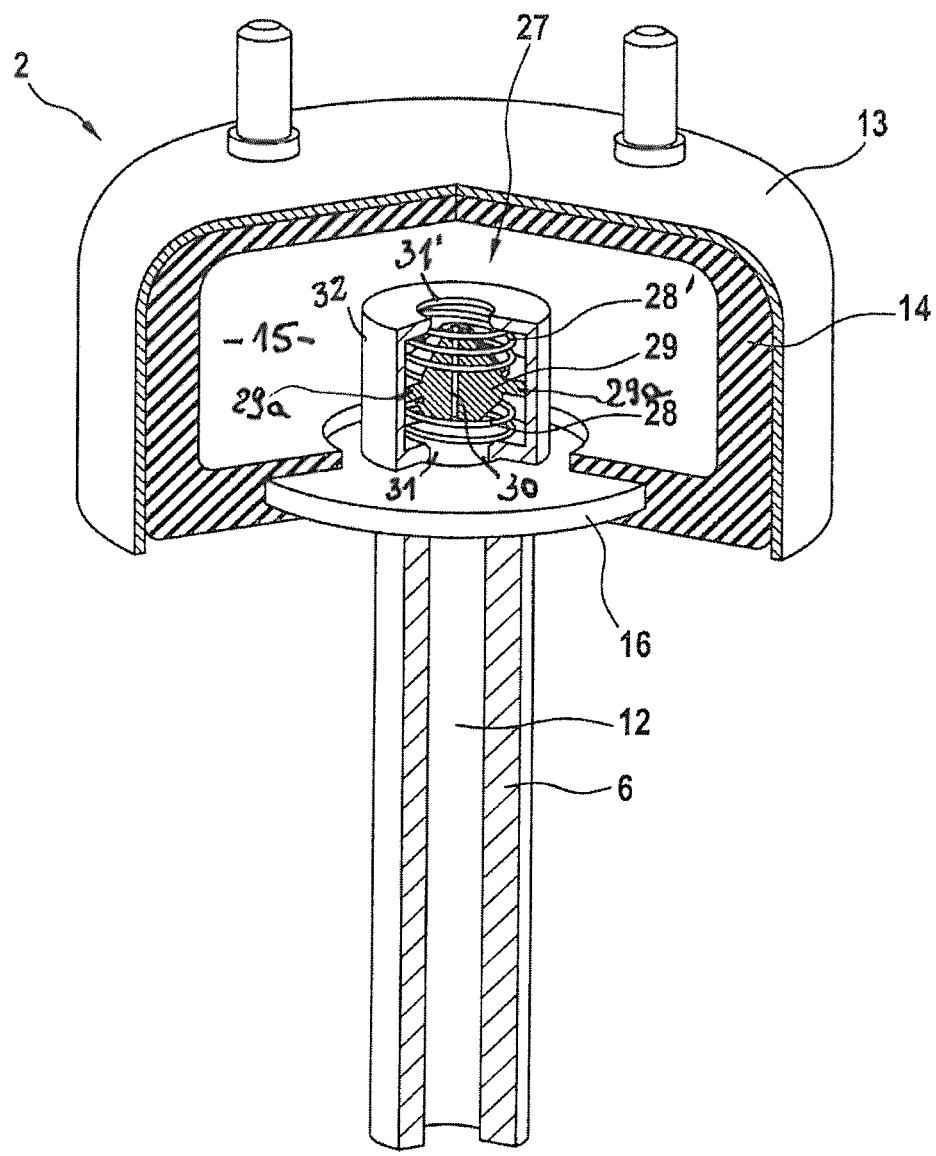

FIGS. 3 to 5 show three different variants of a throttle valve, merely illustrated by the valve housing 32 in FIG. 2, in the fluid-conducting connection 12. It will be mentioned once more expressly at this point that the hydraulic damping device explained above with the throttle plate 20 is purely optional, and is therefore not shown or not present, or at least does not have to be present, in FIGS. 3-5. However, on the basis of these FIGS. 3-5 a more detailed description is given of a throttle valve which is able to throttle differently the flow of hydraulic medium between the damper chamber 8 in the damper cylinder 3 and the hydraulic pressure chamber 15 in the damper mount 2 which is conducted via the fluid-conducting connection 12.

The exemplary embodiment according to FIG. 3 shows what is referred to as a rebound stage throttle valve 25 which acts in a throttling fashion in the (basically already explained) rebound stage of the vibration damper 1, but in contrast in the compression stage of the vibration damper 1 is virtually unthrottled, i.e. then virtually does not constitute an obstacle to flow. A valve body 29 which can be shifted in the vertical direction (i.e. in the longitudinal direction of the piston rod 6) within the valve housing 32 (and which is spaced apart from the inner wall of the valve housing 32 here) has in a central position a throttle bore 30 which runs in the longitudinal direction of the piston rod 6 and through which only a very small quantity of hydraulic fluid can flow. This valve body 29 is pressed against its valve seat 31, located at the bottom, by means of a spring element 28 which is supported on the cover area, located at the top, of the valve housing 32. This valve seat 31 which is located at the bottom is, presented in simple terms, a passage opening in the base of the valve housing 32, which passage opening constitutes a connection between the fluid-conducting connection 12, provided in the piston rod 6, and the interior of the valve housing 32. Provided as it were in a mirror-inverted fashion with respect to this valve seat 31 in the upper cover area of the valve housing 32 is an overflow opening for hydraulic fluid from the interior of the valve housing 32 into the hydraulic pressure chamber 15 which is referred to by the reference number 31". If the valve body 29 is then in its figuratively illustrated position in which it is seated on the valve seat 31, only a very small quantity of hydraulic fluid can overflow through the throttle bore 30 between the fluid-conducting connection 12 in the piston rod 16 and the hydraulic pressure chamber 15. If, on the other hand, the vibration damper 1 is in the state of what is referred to as the compression stage, the valve body 29 of the rebound stage throttle valve 25 is lifted off from the valve seat 31 owing to the then significantly higher hydraulic pressure in the lower damper chamber 8 of the damper cylinder 3, which is conducted through the fluid-conducting connection 12 in the piston rod 6 to the rebound stage throttle valve 25, and a significantly larger quantity of hydraulic fluid can overflow from the damper chamber 8 into the hydraulic pressure chamber 15.

The exemplary embodiment according to FIG. 4 shows a rebound and compression stage throttle valve 26 in the valve housing 32. Here, two valve bodies 29, 29', between which a spring element 28 is clamped, are provided diametrically opposite one another in the vertical direction. If there is no additional force effect present (apart from the force of gravity) the spring element 28 presses each valve body 29, 29' against its respective valve seat 31 or 31', which valve seats are, once more expressed in a simplified fashion, nothing other than passage openings (for hydraulic fluid) in the lower base or in the upper cover area of the valve housing 32. As can be seen, the throttle bores 30, 30' which are also provided centrally in these valve bodies 29, 29' have a different cross section. In the compression stage of this vibration damper 1, the lower valve body 29 lifts off from its valve seat 31 here (in a way analogous to the exemplary embodiment explained above), while the upper valve body 29' remains on its valve seat 31' and the throttle bore 31', having a larger passage cross section, of the upper valve body 29' then acts. In contrast, in the rebound stage of this vibration damper 1 the upper valve body 29' lifts off from its valve seat 31', while the lower valve body 29 remains on its valve seat 31 and the throttle bore 30, having a relatively small passage cross section, of the lower valve body 29 then acts.

The exemplary embodiment according to FIG. 5 shows what is referred to as an amplitude-selective throttle valve 27 within the valve housing 32. Here, only a single valve body 29, which can be displaced in the longitudinal direction of the piston rod 16, is present again, which valve body 29 is held by two spring elements 28, 28', lying diametrically opposite one another in the displacement direction of the valve body 29, between the valve seats 31, 31', located opposite one another and provided analogously in FIG. 4, in the base or in the cover area of the valve housing 32, if, with the exception of gravity, no further forces are acting on this valve body 29, which in turn has a throttle bore 30 which runs centrally. In contrast to the exemplary embodiments explained above, the valve body 29 is guided here through the cylinder wall of the valve housing 32 and therefore lies circumferentially, in the form of a circle, with a sealing edge 29a on the cylindrical inner wall of the valve housing 32.

In the illustrated position of the valve body 29 in FIG. 5, firstly a certain relatively large quantity of hydraulic fluid can flow between its two valve seats 31, 31', either from the hydraulic pressure chamber 15 or from the fluid-conducting connection 12 in the piston rod 6 into the interior of the valve housing 32, and back again out of the valve housing 32 as a result of (already explained) slight oscillations of the piston rod 16 which are to a relatively high frequency, and can flow back specifically until the space between the respective valve seat 31 or 31' or the respective passage opening and the circumferential sealing edge 29a of the valve body 29 is filled. However, as soon as significantly larger quantities of hydraulic fluid flow into the valve housing 32 in the rebound stage or compression stage of the vibration damper 1, the valve body 29 is, as a consequence thereof, pressed against one of its valve seats 31 or 31'. Specifically, the valve body 29 (similar to the exemplary embodiment of FIG. 4) is pressed in the compression stage of the vibration damper 1 against its upper valve seat 31' by a quantity of hydraulic fluid which is then larger, while in the rebound stage of the vibration damper 1, the valve body 29 is pressed against it lower valve seat 31 by a quantity of hydraulic fluid which is then larger. As soon as the valve body 20 is, however, seated on one of its valve seats 31, 31', only a small quantity of hydraulic fluid can then still be discharged from the fluid-conducting connection 12 in the piston rod 6 or from the hydraulic chamber 15 through the throttle bore 30 of the valve body 29. The position of the valve body 29 of this amplitude-selective throttle valve 27 is therefore, as it were, dependent on the amplitude of the respective oscillations, specifically as a function of whether a relatively large or relatively small quantity of hydraulic fluid passes into the interior of the valve housing 32.

It should be noted that, in addition to the low frequency, the visible deflection movements and the rebound movements of the respective wheel in relation to the vehicle body, the relatively high frequency oscillation processes explained above are also relevant. In particular, the relatively high frequency oscillation processes also cause oscillating movements of the hydraulic fluid in the entire system of a vibration damper 1 according to the invention, during which movements the respective throttle valves 25, 26, 27 act as described.

Returning now briefly to the exemplary embodiment according to FIG. 1, the figure shows an embodiment of the vibration damper 1 as an active damper with a or the hydraulic pump 9. However, the various embodiments which are illustrated in FIGS. 2-5 and are claimed in the patent claims can also be used in a "simple" vibration damper, which does not permit any "active damping", and in which the hydraulic fluid is set in motion only by oscillation excitations between the roadway surface and the vehicle body. Even in the case of non-active dampers, in fact tension-free elastic mobility of the elastic body 14 in the damper mount 2 is also advantageous.

A development which is possible for all the exemplary embodiments according to which a material which damps pressure oscillations is provided at least partially in the pressure chamber 15 is not illustrated figuratively. Therefore, "relatively high frequency" pressure oscillations which possibly occur (once more) in the pressure chamber 15, of the hydraulic fluid or in the hydraulic fluid, can be transmitted from the damper chamber 8 into the pressure chamber 15 via the fluid-conducting connection 12, and be damped with the result that there is no risk of the hydraulic fluid being able to pass into the vehicle body via the housing 13 of the damper mount 2. Of course, this material must not fill the pressure chamber 15 to such an extent that the pressure chamber 15 can no longer perform its above described function of establishing an equilibrium of forces. Material which damps pressure fluctuations can be, for example, a suitable foamed material with which, for example, the walls of the pressure chamber 15 are lined, as is illustrated in FIG. 2 in the form of a component of the elastic body 14. However, the pressure chamber 15 can also be alternatively filled with elastic, i.e. compressible balls, or other measures which are known to a person skilled in the art for vibration damping can be implemented.

LIST OF REFERENCE NUMBERS

1 Damper
2 Damper mount
3 Cylinder
4 Connection to the wheel
5 Piston
6 Piston rod
7 First chamber
8 Second chamber
9 Hydraulic pump
10 Electric machine
11 Pressure accumulator
12 Fluid-conducting connection
13 Housing
14 Elastic body
15 Pressure chamber
16 Attachment disk
17 Diameter
18 First area
19 Second area
20 First working space
21 Second working space
22 Throttle plate
23 Equalization space
24 Diaphragm
25 Rebound stage throttle valve
26 Rebound and compression stage throttle valve
27 Amplitude-selective throttle valve
28 Spring element
29 Valve body
30 Throttle bore (in valve body 29)
31 Valve seat
32 Valve housing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vibration damper of a vehicle wheel supported on a vehicle body by a damper mount having an elastic body, the vibration damper comprising:
    a fluid-filled cylinder;
    a piston guided in the cylinder; and
    a piston rod,
    wherein a damper chamber is formed in the cylinder on each side of the piston,
    wherein the damper mount comprises a hydraulic pressure chamber connected via a fluid-conducting connection to the damper chambers, whose volumes are respectively reduced when the vehicle wheel is deflected in relation to the vehicle body,
    wherein a throttle valve is provided in the fluid-conducting connection, wherein the throttle valve comprises a valve body that is displaceable in relation to a valve seat counter to a spring force, and wherein a throttle bore runs through the valve body, and
    wherein the damper mount comprises a fluid-filled first working space in the elastic body, a second working space in the damper mount outside the elastic body, and at least one throttle plate between the first and second working spaces.

2. The vibration damper as claimed in claim 1, wherein the damper chambers formed on each side of the piston in the damper cylinder are hydraulically connected to one another via a hydraulic pump driven by an electric motor.

3. The vibration damper as claimed in claim 2, wherein an end of the piston rod which projects out of the damper cylinder is connected to the elastic body of the damper mount, and wherein the fluid-conducting connection runs through the piston rod.

4. The vibration damper as claimed in claim 2, wherein the throttle valve is embodied as a throttle which is predominantly effective in a vibration damper rebound stage in that the valve body can lift off from the valve seat, counter to the spring force, only in a vibration damper compression stage.

5. The vibration damper as claimed in claim 2, wherein the throttle valve is formed by two valve bodies and corresponding throttle bores, wherein the two valve bodies are pressed against respective valve seats by the spring force, and wherein the throttle bores have different cross sections from one another.

6. The vibration damper as claimed in claim 2, wherein the throttle valve is embodied as an amplitude-selective throttle valve whereby the valve body is displaceable in a rebound stage direction and in a compression stage direction within a valve housing, wherein the amplitude-selective throttle valve is held in a state in which it is lifted off from two valve seats lying opposite one another, without a hydraulic force acting therebetween.

7. The vibration damper as claimed in claim 1, wherein an end of the piston rod which projects out of the damper cylinder is connected to the elastic body of the damper mount, and wherein the fluid-conducting connection runs through the piston rod.

8. The vibration damper as claimed in claim 7, wherein the throttle valve is embodied as a throttle which is predominantly effective in a vibration damper rebound stage in that the valve body can lift off from the valve seat, counter to the spring force, only in a vibration damper compression stage.

9. The vibration damper as claimed in claim 7, wherein the throttle valve is formed by two valve bodies and corresponding throttle bores, wherein the two valve bodies are pressed against respective valve seats by the spring force, and wherein the throttle bores have different cross sections from one another.

10. The vibration damper as claimed in claim 7, wherein the throttle valve is embodied as an amplitude-selective throttle valve whereby the valve body is displaceable in a rebound stage direction and in a compression stage direction within a valve housing, wherein the amplitude-selective throttle valve is held in a state in which it is lifted off from two valve seats lying opposite one another, without a hydraulic force acting therebetween.

11. The vibration damper as claimed in claim 1, wherein the throttle valve is embodied as a throttle which is predominantly effective in a vibration damper rebound stage in that the valve body can lift off from the valve seat, counter to the spring force, only in a vibration damper compression stage.

12. The vibration damper as claimed in claim 1, wherein the throttle valve is formed by two valve bodies and corresponding throttle bores, wherein the two valve bodies are pressed against respective valve seats by the spring force, and wherein the throttle bores have different cross sections from one another.

13. The vibration damper as claimed in claim 1, wherein the throttle valve is embodied as an amplitude-selective throttle valve whereby the valve body is displaceable in a rebound stage direction and in a compression stage direction within a valve housing, wherein the amplitude-selective throttle valve is held in a state in which it is lifted off from two valve seats lying opposite one another, without a hydraulic force acting therebetween.

14. The vibration damper as claimed in claim 1, wherein a gas-filled equalization space is formed in the damper mount, and a diaphragm is provided between the equalization space and the second working space.

15. The vibration damper as claimed in claim 1, wherein the pressure chamber has a hydraulically effective first area perpendicular to the piston rod, and the piston has a hydraulically effective second area perpendicular to the piston rod, and wherein a size of the first area is 80% to 120% of a size of the second area.

16. The vibration damper as claimed in claim 1, wherein a material which damps pressure oscillations is provided at least partially in the pressure chamber.

17. A vibration damper of a vehicle wheel supported on a vehicle body by a damper mount having an elastic body, the vibration damper comprising:
    a fluid-filled cylinder;
    a piston guided in the cylinder; and
    a piston rod,
    wherein a damper chamber is formed in the cylinder on each side of the piston,
    wherein the damper mount comprises a hydraulic pressure chamber connected via a fluid-conducting connection, having a throttle valve, to the damper chambers, whose volumes are respectively reduced when the vehicle wheel is deflected in relation to the vehicle body, and
    wherein the damper chambers formed on each side of the piston in the damper cylinder are hydraulically connected to one another via a hydraulic pump driven by an electric motor, thereby forming a hydraulic circuit, wherein a hydraulic pressure accumulator is connected to the hydraulic circuit, and said throttle valve comprises a valve body that is displaceable in relation to a valve seat counter to spring force, wherein a throttle bore runs through the value body and is configured such that, at low vibration frequencies of less than 10-15 Hertz, a complete pressure equalization occurs between the hydraulic pressure chamber and said damper chamber, and at high frequencies of between 15 Hertz and several thousand Hertz, a differentiation pressure occurs between the pressure chamber of the damper mount and the damper chamber.

* * * * *